United States Patent
Spillmann et al.

(10) Patent No.: US 7,936,404 B2
(45) Date of Patent: May 3, 2011

(54) METHOD FOR STACKING THERMAL ACTUATORS WITH LIQUID CRYSTAL ELASTOMER

(75) Inventors: Christopher M. Spillmann, Alexandria, VA (US); David Cylinder, New Egypt, NJ (US); Banahalli R. Ratna, Woodbridge, VA (US); Jawad Naciri, Herndon, VA (US); Brett D. Martin, Washington, DC (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 818 days.

(21) Appl. No.: 11/896,306

(22) Filed: Aug. 30, 2007

(65) Prior Publication Data

US 2008/0079858 A1  Apr. 3, 2008

Related U.S. Application Data

(60) Provisional application No. 60/848,052, filed on Sep. 29, 2006.

(51) Int. Cl.
*G02F 1/133*  (2006.01)

(52) U.S. Cl. ............................................. 349/20; 349/21

(58) Field of Classification Search .............. 349/20–21; 399/328–330, 333, 33; 428/411.1, 352, 402, 428/332
See application file for complete search history.

(56) References Cited

U.S. PATENT DOCUMENTS

| | | | | |
|---|---|---|---|---|
| 3,977,660 | A | * | 8/1976 | Nakahira ..................... 266/265 |
| 5,021,762 | A | * | 6/1991 | Hetrick ........................ 337/103 |
| 6,312,770 | B1 | * | 11/2001 | Sage et al. ..................... 428/1.1 |
| 7,550,189 | B1 | * | 6/2009 | McKnight et al. ............ 428/116 |
| 7,575,807 | B1 | * | 8/2009 | Barvosa-Carter et al. . 428/411.1 |
| 2003/0053912 | A1 | * | 3/2003 | Jacot et al. ..................... 416/30 |
| 2006/0240675 | A1 | * | 10/2006 | Vepa et al. .................... 438/726 |
| 2007/0108407 | A1 | * | 5/2007 | Naciri et al. ............. 252/299.01 |
| 2008/0170936 | A1 | * | 7/2008 | Toonder et al. ............... 415/140 |

* cited by examiner

*Primary Examiner* — Hoan C Nguyen
(74) *Attorney, Agent, or Firm* — Amy L. Ressing; Stephen T. Hunnius

(57) ABSTRACT

An apparatus comprising a first liquid crystal elastomer, a first heating element, a first layer of thermal paste, and a second liquid crystal elastomer. The apparatus further comprising a second heating element, a second layer of thermal paste, and a third liquid crystal elastomer. The heating element can be a nickel-chromium heating element. A method comprising arranging a first heating element on a first liquid crystal elastomer, arranging a first layer of thermal paste on the first heating element, and arranging a second liquid crystal elastomer on the first layer of thermal paste.

9 Claims, 4 Drawing Sheets

METHOD FOR STACKING THERMAL ACTUATORS WITH LIQUID CRYSTAL ELASTOMER

This application claims the benefit of provisional application No. 60/848,052 filed on Sep. 29, 2006.

A developing technology is the creation of smart materials that respond to external stimuli resulting in a change in the shape or size of that material. These materials include hydrogels, conducting polymers, dielectric elastomers, carbon nanotube films, and nematic or ferroelectric liquid-crystalline elastomers. They have been developed to respond to external stimuli, such as temperature, electric field, ion concentration, changes in pH, etc. and have a wide range of physical properties, including stress, strain, and response time.

The response of an actuator, particularly a muscle-like material, is controlled by three principle parameters: the strain of the material, the blocked stress it is capable of exerting, and the speed of the response. The optimization of these three parameters is important for successful implementation in a wide range of applications including robotics, microfluidics, micro-electromechanical systems (MEMS), and shape changing membranes.

Thermally actuated materials, such as nematic LCEs, have mechanical properties similar to skeletal muscle and have the potential to be used for applications requiring muscle-like contractions. In particular, nematic LCEs provide reversible anisotropic contraction as the material is heated/cooled through the nematic to isotropic transition temperature, $T_{NI}$. A key issue in the use of such thermally actuating materials is the ability to produce sufficient force for particular applications given the blocked stress of the material. The solution is to increase the cross-sectional area of the material, but there are several limiting factors that dictate how the thickness of a sample will affect actuation.

First, the LCEs are produced as thin films in order to maintain the nematic phase alignment of the LCE through the bulk thickness of the material. Alignment of the nematic elastomer originates with a chemical layer at the LC interface that has been mechanically rubbed. As the thickness of a sample is increased, the alignment through the bulk of the material can be lost, thus limiting the thickness of an individual LCE film.

Another solution is to stack the thermally actuated LCEs. There are two options to then induce actuation of the films. The first is to layer several films on top of one another and through external heating in a controlled environment induce actuation. Such a method requires that each LCE stack be in an insulated and strictly temperature controlled environment. In addition, heating of such an LCE stack would be dependent upon the thermal conductivity of the films, i.e. the ability for heat to be efficiently transferred through the individual films in order to maintain uniform contraction of the stack. This approach is limited because it requires a large input energy to induce actuation and limits the rate of contraction.

BRIEF DESCRIPTION OF THE FIGURES

FIG. 3a illustrates Ni-Chrome wires patterned into heating elements. FIG. 3b is a schematic representation of a two-film stack. Each film would have been previously coated with thermal grease on the side facing the heating element. In such a way, several films could be layered on top of one another.

FIG. 4a illustrates the LCE stack was hung next to a ruler under minimal load in order to monitor contraction of the film upon application of a current. FIG. 3b illustrates typical contraction rate curve of a two-film stack demonstrating ~10% strain within one second.

FIG. 5a illustrates maximum sustained contractile force of a 4-film stack under isometric conditions. The dimensions of the stack are provided. FIG. 5b illustrates summary of preliminary results of the stacked LCE force production. Each data point represents the maximum force sustained by a stack before yielding.

DETAILED DESCRIPTION

Herein is described a unique approach that involves internal heating of an LCE stack (or any other thermally actuated material). Individual LCE films are layered between thermal grease and nickel-chromium (Ni-Chr) heating elements. The embedded heating elements in combination with a thermal grease results in rapid heat distribution through an LCE stack allowing for contractile force production in a minimal amount of time.

Relates to a new approach of layering LCE films to create thermally actuated stacks. Increases the amount of force produced by several LCE films upon actuation given the blocked stress of individual films. Stacking of the LCE films is useful in applications where forces greater than those produced by individual films are required. For example a series of about four liquid crystal elastomers stacked with three heating elements embedded in a thermally conductive paste can be utilized. A heating element and thermally conductive grease embedded between the elastomer films provides a means for internal heat application and distribution when a current is passed through the heating element. Eliminates the need for external heating of the LCE stacks while allows for rapid distribution of the heat through the films and, hence, rapid contraction and force production by the stack.

Figure 1:
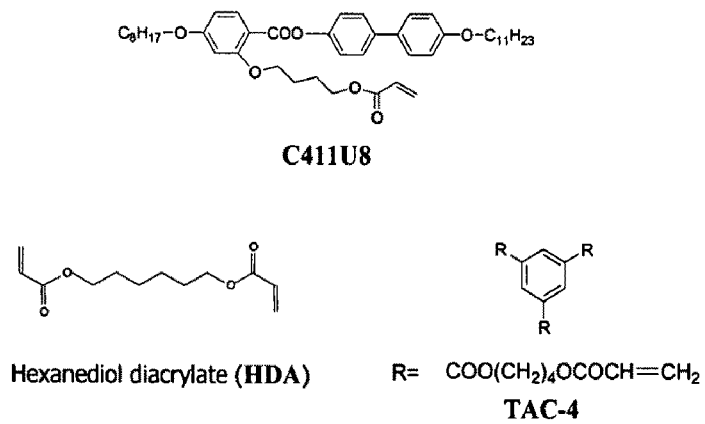
FIG. 1 illustrates chemical structures of the components in the nematic elastomer films used for stacking. The materials include the side-on nematic monomer, C411U8, and the two cross-linking agents, HDA and TAC-4.

Relates to a new approach of stacking thermal actuated nematic elastomer films with heating elements and thermal compound. The preparation of nematic films has been described previously. For the experiments described here, a single nematogen, C411U8, and two cross-linkers HDA and TAC-4 (see FIG. 1) are used. The components each contain one or more polymerizable acrylate site(s).

The following is a brief overview of the procedure for preparing an LCE film. A mixture of 85.9 mole percent (mol %) monomer, 10 mol % HDA, and 4 mol % TAC-4 was dissolved in dichloromethane with 0.1 mol % of the photo-initiator Irgacure-369. Following evaporation of the solvent, the mixture was heated above $T_{NI}$ and filled into a glass cell on a temperature-controlled hot stage. Glass cells were made of two nylon-rubbed, anti-parallel, poly-vinyl acrylate (PVA) coated glass plates separated by Mylar spacers, which determined the film thickness of either 50 or 100 microns.

Once the cell was filled, the mixture cooled below $T_{NI}$, aligned in the nematic phase, and finally polymerized and cross-linked with UV light for 8 minutes at ~6 mW/cm² to create the LCE film. Films were removed from the glass by dissolving the PVA in 80° C. water until the glass separated from the film. Individual films have been shown to provide uniaxial contraction with ~20% strain at a transition temperature of 65° C. and a blocked stress of at least ~200 kPa.

Figure 2:
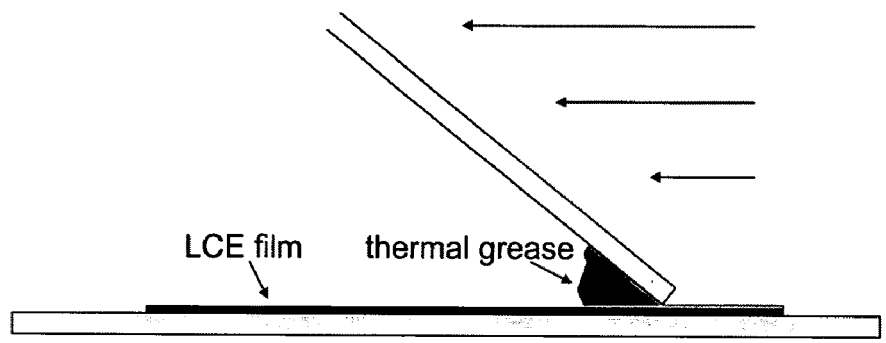
FIG. 2 is a schematic diagram demonstrating application of thermal grease to an LCE film.

LCE films were cut into multiple pieces of the same size and coated with a thin film of the thermal compound Arctic Silver 5. A typical LCE film measured 2×1 cm (L×W). As shown in FIG. 2, the thermal grease was applied by placing a small amount near the edge of a smooth surface, such as a microscope slide or any tool with an even edge. The tool was then drawn across the film several times to produce a smooth layer of thermal grease. The thickness of the thermal compound layer was typically ~100 microns or less.

The heating element was designed to fit between LCE films in order to create an internal heat source for the stacks. A Ni-Chr alloy (90% nickel, 10% chromium) wire was used to create the heating elements due to its superior thermal conductivity and common use in high temperature resistance applications. A wire diameter of 0.051 mm was used and provided the heating while remaining embedded within the thermal grease and did not reduce the uni-axial strain upon actuation.

Figure 3:
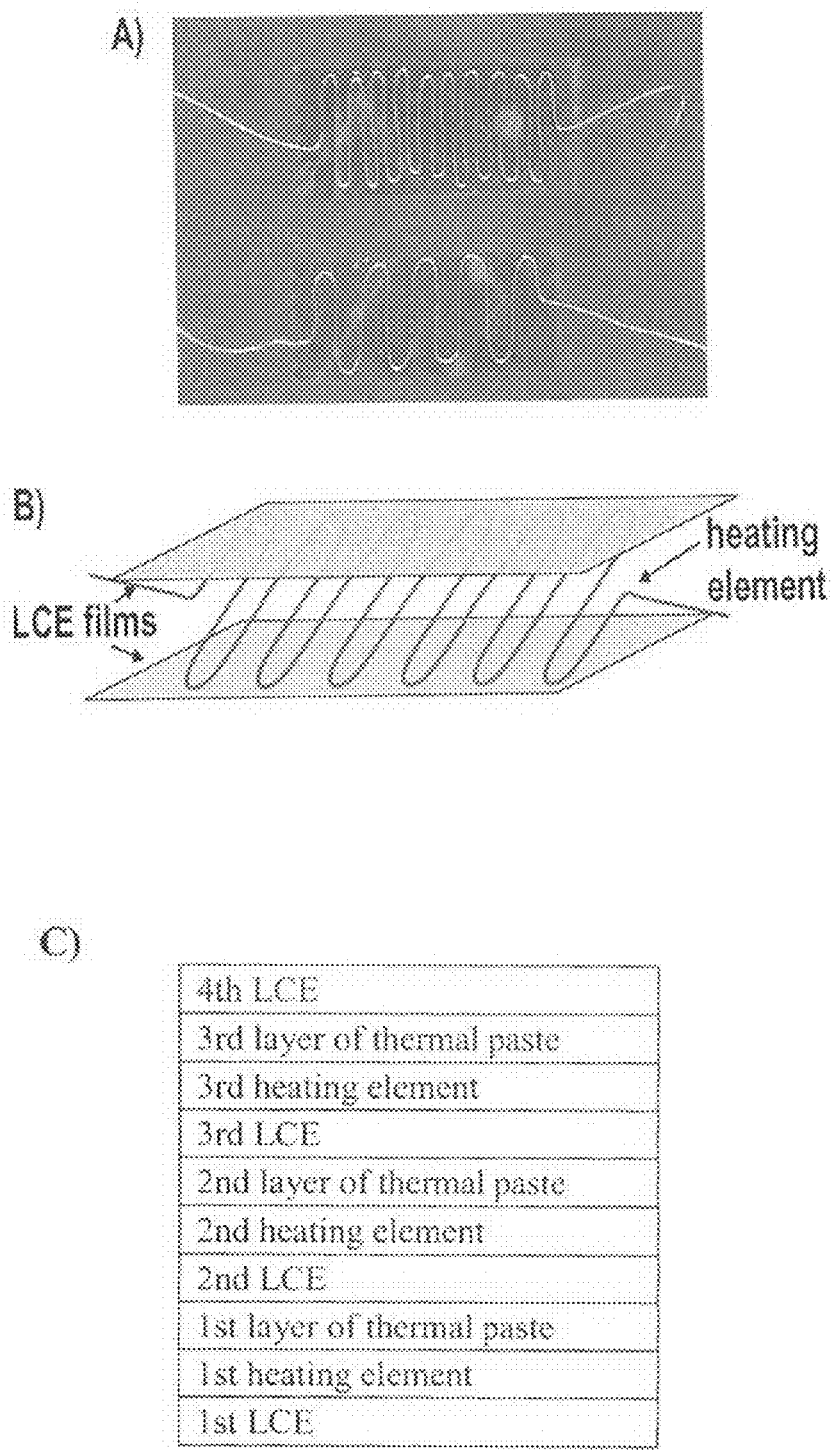
FIG. 3 illustrates patterning of the Ni-Chrome heating elements and stacking of LCE films.

Patterning of the wire was performed using a breadboard with evenly spaced pegs to provide a uniformly patterned heating element that covered the maximum surface area of the LCE films. Two Ni-Chr wire heating elements are shown in FIG. 3A. The heating elements were placed in between films to create an LCE stack, schematically shown in FIG. 3B. The typical two-film stack dimensions were 2.0 cm×1.0 cm×0.025 cm (L×W×T) when composed of two 100 µm-thick films.

Figure 4:
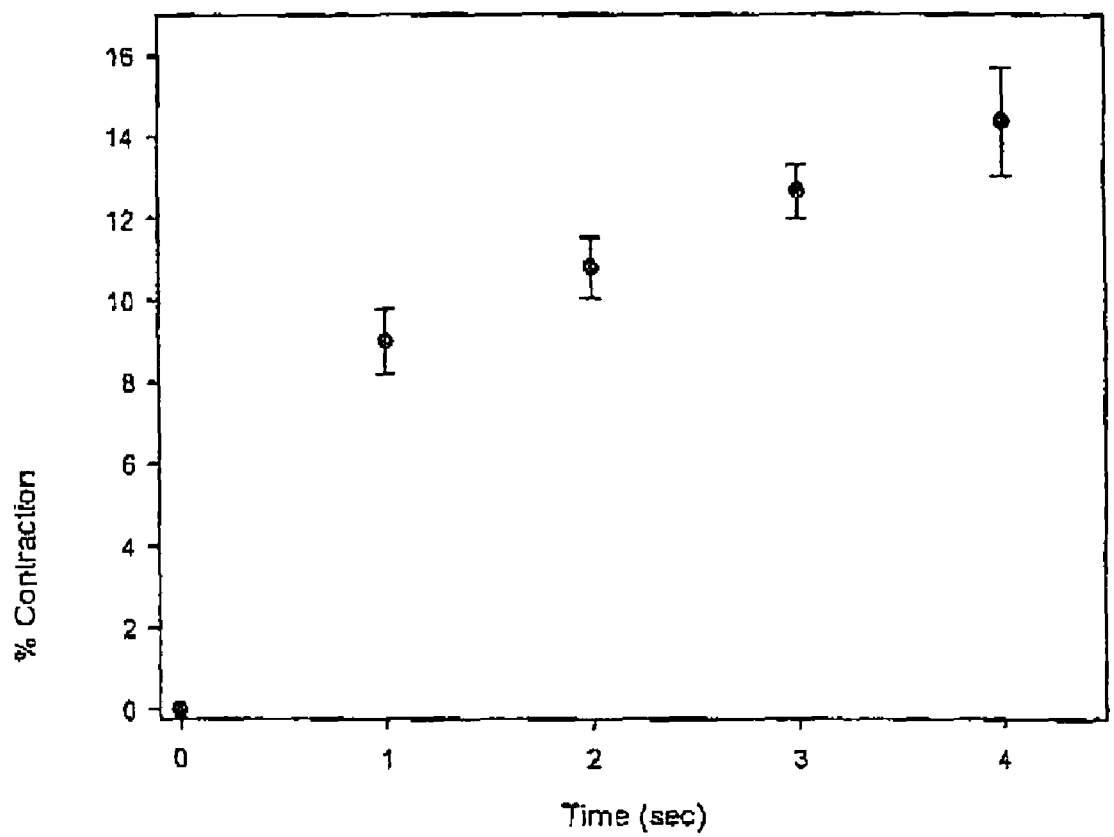
FIG. 4 illustrates a LCE stack setup to measure strain and contraction rate.

Three important parameters were measured from LCE stacks: the strain, contraction rate, and contractile force. The contraction rate and strain were measured by hanging the LCE stack under minimal load, as shown in FIG. 4A. A ruler was placed next to the stack to monitor changes in length. These experiments were video recorded for analysis. The Ni-Chr wire leads were attached a switch in-line with a power supply that supplied two currents to the heating element in the stack. In order to maximize the contraction rate a "resting" current was first applied to the stack to heat it to a temperature just below the transition temperature. The switch was then flipped to apply a higher current and heat the stack above the LCE transition temperature and cause uni-axial contraction of the stack.

Upon current application (up to 110 mA), stacks composed of two 100 µm-thick films with a single heating element showed an 18% strain between contracted and relaxed states over at least 8 cycles (30 sec hold time at each current). The 18% strain demonstrates that the strain of the material has not been compromised by adding the heating element and thermal grease. For a given 30 second high current application, by 10 seconds the muscle contracted to 80% of the full contraction. When a 10 second hold time was used, muscles showed a 10% difference in length between contracted and relaxed states over at least 8 cycles. FIG. 4B displays the average strain as a function of time and demonstrates that the LCE stacks can achieve 10% contraction within 1 second.

Several film stacks were tested to examine the repeatability of the force production as a function of the cross-sectional area. The force produced by stacked LCEs was measured on an apparatus with a load sensor at a fixed displacement. The LCE stack was first mounted in a fixed clamp with the heating element(s) attached to a power supply lead. The other end of the stack was mounted to a movable clamp with the heating elements attached to the other lead of a power supply with a switch. The device allowed the stack to be mounted in an isometric configuration while a current was passed through the heating elements and the stack produced a contraction force. Stacked films were tested by systematically increasing the distance between the holding clamps following actuation (application of a current through the heating elements).

Figure 5:
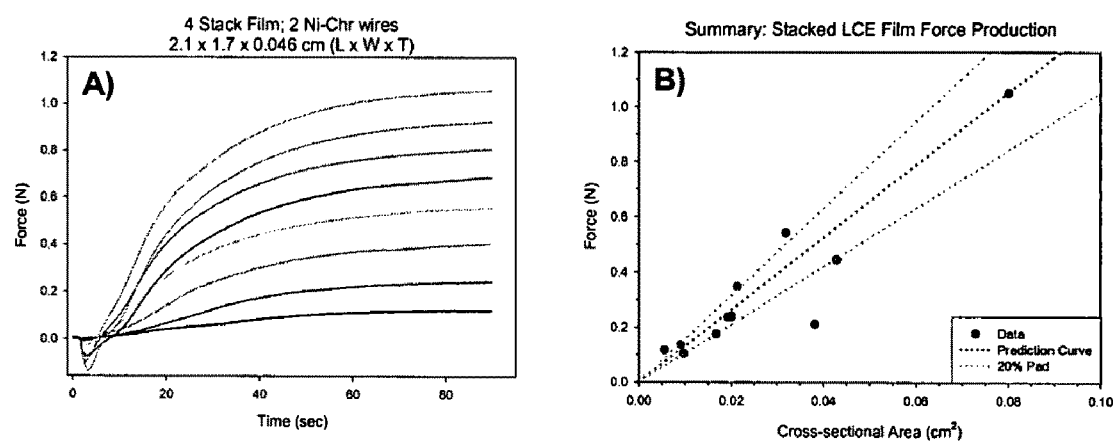
FIG. 5 illustrates force production of C411U8 stacks. Tests were performed on stacks made up of 2, 3, or 4 films. Stacks were composed of either 50 or 100 μm thick films and the width of the stacks varied between 0.5 and 1.0 cm.

Force measurements represent the maximum force sustained by a contracted LCE stack at a given displacement. FIG. 5A shows the force profile of a 4×100 µm-thick stack as the displacement between the stack holders was incrementally increased. The three heating elements used in this stack were attached in parallel to each other. Ultimately the stacks yielded when the force produced by the stacks was overcome by the force required to keep the holders stationary. The cross-sectional area of the films and the maximum force produced by stacked LCEs were measured for several stacks and used to calculate the blocked stress of the stack units. The blocked stress of the thermally actuated stacks was estimated to be ~130 kPa. Given this value, a prediction of the force as a function of the cross-sectional are of the films is shown in FIG. 5B.

The description herein provides a means by which thermally actuated films can be stacked into multi-layered units for large force production. The incorporation of heating elements provides a unique way to internally heat a stack to induce uni-axial contraction of the stack upon application of a current. The method eliminates the need for an externally controlled environment for applications ranging from robotics, microfluidics, shape changing membranes, etc.

The methods and apparatus described herein are not restricted to LCE thermal actuators with polyacrylate as the backbone. Different backbones and cross-linkers can be used. One such alternative is to use polysiloxane or polynorbornene as backbones with acrylates cross-linkers. The pattern of the heating element is not limited to the design shown in FIG. 3, but can be applied to other patterns that cover the surface of a thermal actuator.

The above description is that of a preferred embodiment of the invention. Various modifications and variations are possible in light of the above teachings. It is therefore to be understood that, within the scope of the appended claims, the invention may be practiced otherwise than as specifically described. Any reference to claim elements in the singular, e.g., using the articles "a," "an," "the," or "said" is not construed as limiting the element to the singular.

What we claim is:

1. An apparatus comprising:
    a first liquid crystal elastomer having a first side and a second side;
    a first heating element on said second side;
    a first layer of thermal paste on said first heating element;
    a second liquid crystal elastomer having a first side and a second side wherein said first side is on said first layer of thermal paste;
    a second heating element on said second side of said second liquid crystal elastomer;
    a second layer of thermal paste on said second heating element; and
    a third liquid crystal elastomer having a first side and a second side wherein said first side is on said second layer of thermal paste;
    wherein said liquid crystal elastomer linearly contracts about 10% within about 1 second when activated via application of a current through the nickel-chromium heating element.

2. The apparatus of claim 1 wherein said first heating element is a nickel-chromium heating element.

3. The apparatus of claim 2 wherein said nickel-chromium heating element is about 90% nickel and about 10% chromium.

4. The apparatus of claim 1 wherein the liquid crystal elastomer responds to a thermal stimulus resulting in contraction of the liquid crystal elastomer.

5. The apparatus of claim 2 wherein said nickel-chromium heating element is from about 0.002 to about 0.0005 inches in diameter.

6. The apparatus of claim 4 wherein said liquid crystal elastomer film is from about 25-75 µm thick.

7. The apparatus of claim 1 wherein forces of about 1 N are achieved with a series of about four liquid crystal films stacked with three heating elements embedded in a thermally conductive paste.

8. The apparatus of claim 7 wherein said liquid crystal elastomers are about 100 µm thick.

9. An apparatus comprising:
a first liquid crystal elastomer having a first side and a second side;
a first heating element on said second side;
a first layer of thermal paste on said first heating element wherein said first heating element complies with the actuation of the elastomer; and
a second liquid crystal elastomer having a first side and a second side wherein said first side is on said first layer of thermal paste and wherein said first and second liquid crystal elastomer respond to Joule heating;
a second heating element on said second side of said second liquid crystal elastomer;
a second layer of thermal paste on said second heating element;
a third liquid crystal elastomer having a first side and a second side wherein said first side is on said second layer of thermal paste;
a third heating element on said second side of said third liquid crystal elastomer;
a third layer of thermal paste on said third heating element;
a fourth liquid crystal elastomer having a first side and a second side wherein said first side is on said third layer of thermal paste;
wherein forces of about 1 N are achieved with said series of about four liquid crystal elastomers stacked with three heating elements embedded in a thermally conductive paste.

* * * * *